Aug. 3, 1948.     J. A. STROMELLY     2,446,252
EARRING CLAMP
Filed March 20, 1947

INVENTOR.
Joseph A. Stromelly
BY Fraser, Myers & Manley
ATTORNEYS.

Patented Aug. 3, 1948

2,446,252

UNITED STATES PATENT OFFICE 2,446,252

EARRING CLAMP

Joseph A. Stromelly, New York, N. Y.

Application March 20, 1947, Serial No. 735,847

5 Claims. (Cl. 63—14)

My present invention relates to earrings of the screw clamp type and aims to provide certain improvements therein.

Earrings worn by women are frequently made of precious metal fabricated into novel designs and/or ornamented with precious or semi-precious stones, beads, miniature paintings or other decorations. The more expensive earrings are usually designed and made to order in pairs, and the loss of one earring renders the other one of but little value or necessitates time-consuming and costly reproduction. Nowadays women's ears are not usually pierced to accommodate earrings, hence, clips, screw clamps and other means are employed to attach the earrings to the lobes of the ears. By far, screw clamps are the means most generally used for this purpose. These screw clamps, however, have a tendency to work loose due to various causes and thus give rise to the detachment and possible loss of the earrings. Hence, the guarding against accidental loss and replacement of such earrings is the concern of many women.

The present invention accordingly has among its objects, the following: (1) to provide a simple and efficient means for the screw clamp of an earring to guard against accidental detachment and loss of the earring; (2) to provide such means which are self-locking and foolproof in operation and will function to perform its intended purpose by merely rotating the head at the outer end of the earring clamping screw in the conventional manner; and (3) to provide such means which will be operative regardless of the thickness of the ear lobe to which the earring is applied.

The foregoing and other objects of my invention not specifically enumerated I accomplish by providing cooperating means, preferably in the form of a detent and a recess device, on the support and on the manipulating head of the clamping screw on earrings of the screw clamp type, of a character such that when the manipulating head of the clamping screw is rotated in proximity of the support, increased friction or resistance to turning of the clamping screw will result and act as a latching means to prevent accidental loosening of the clamping screw. The invention will be better understood from the detailed description which follows, when considered in connection with the accompanying drawings showing a preferred embodiment, wherein:

Figure 1:
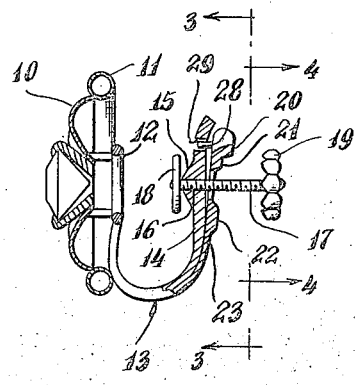
Figure 1 is a sectional view of an earring of the screw clamp type embodying my invention, the said section being taken substantially along the plane of the line 1—1 of Fig. 2.
Figure 2:
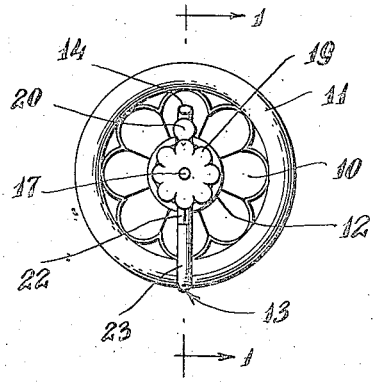
Fig. 2 is a rear elevation of the earring shown in Fig. 1.
Figure 3:
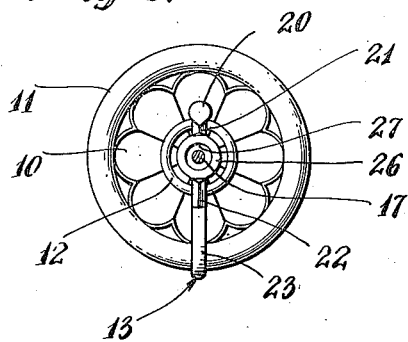
Fig. 3 is a section taken substantially along the plane of the line 3—3 of Fig. 1.
Figure 4:
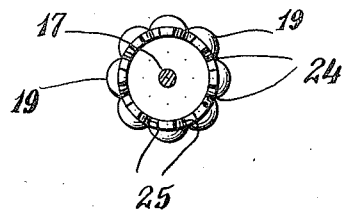
Fig. 4 is a section, on an enlarged scale, taken along the plane of the line 4—4 of Fig. 1.
Figure 5:
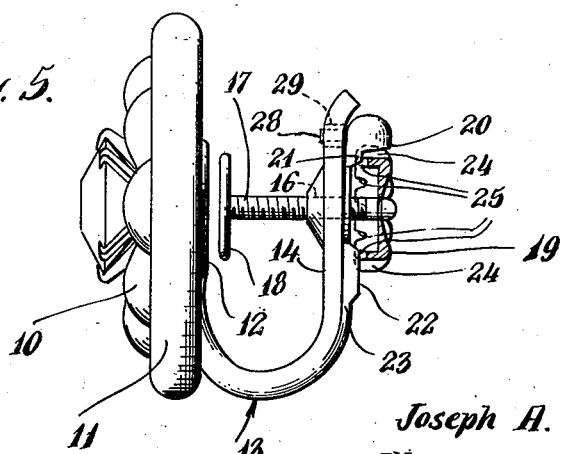
Fig. 5 is a side elevation of the earring shown in Fig. 1 on an enlarged scale, with the screw clamp in what corresponds to the ear lobe engaging position, the head of the manipulating screw being shown in section.

Referring to the drawings, in the various figures of which the same reference characters are employed to designate corresponding parts, the earring may be said to consist of an ornamented portion 10 mounted in a frame 11 having a bearing ring or anvil 12 for engaging the outer face of the lobe of an ear to which the earring is to be attached, a substantially U-shaped resilient support 13 attached to the frame 11 and also to the bearing ring 12, the outer arm 14 of the support having a thickened portion 15 formed with a screw-threaded opening 16 therethrough in which a screw-threaded shank 17 of a screw clamp is movable. The screw-threaded shank 17 at its inner end has swively mounted thereon a clamping disc or ring 18 and at its outer end has fixedly attached thereto a manipulating head 19. The parts thus far described are those conventionally constituting the elements of a screw clamp type earring and, per se, form no part of the present invention.

To prevent accidental loosening of the screw clamp when the clamping disc 18 thereof is in ear-clamping position, I have provided means on the support 13 and on the manipulating head 19 adapted to interengage and cooperate with one another when the head 19 is brought into proximity to the support. As herein shown, said cooperating means consists in providing detent means 20, 21, and 22, formed on a resilient arm 23 carried by the support and extending in alignment therewith, and in forming the manipulating head 19 of the screw clamp with circumferentially spaced recesses 24 in its periphery and circumferentially spaced recesses 25 in the surface of the manipulating head facing the support, the recesses 25 being in radial alignment with the recesses 24. The resilient arm 23 may be either integrally formed with the support by bifurcating the outer arm thereof or by soldering the lower end of the arm to the support. To permit freedom of resilient action for the arm 23 with respect to the screw 17, the arm is formed with an enlarged flattened portion 26 having an opening 27 therein through which the screw freely passes, and to insure alignment of said arm with the support, the arm is provided with a pin 28 engageable in an opening 29 in the support.

The detent 20 is preferably in the form of a blunt wedge which is adapted to engage in the recesses 24 and to ride over the periphery of the manipulating head from one recess to another as the head is rotated when in close proximity to the arm 23. The detents 21 and 22 are also in the form of blunt wedges which are preferably in alignment with the detent 20 and adapted to engage in the recesses 25 in the inner face of the head 19 when the latter is brought into proximity to the arm 23.

In applying an earring embodying the present invention to the lobe of an ear, the lobe will be positioned between the bearing ring 12 and the clamping disc 18 and the manipulating head 19 which latter is normally axially spaced from the support is then rotated to advance the clamping disc 18 toward the bearing ring 12. In the course of such advancement the head 19 will be brought into proximity to the resilient arm 23 so as to first cause engagement between the detent 20 and the recesses 24, which engagement will operate to increase the frictional resistance to rotation of the screw 17 and thus tend to hold the same against accidental turning. When the screw head is further advanced so as to bring the clamping disc 18 into true clamping engagement with the lobe of the ear, the detents 21 and 22 will engage within the recesses 25 of the head 19 and thereby further increase the resistance to rotation of the screw and accidental loosening thereof.

From the foregoing detailed description it will be readily understood that with my novel screw clamp an earring may be securely held in position on the lobe of an ear against accidental detachment and loss. It will also be appreciated that in accomplishing such result, the operation in applying the earring to the ear is precisely the same as heretofore employed with conventional screw clamp type earrings, and hence requires no special instructions for manipulation of parts unfamiliar to women.

It will, of course, be understood that the present invention may be applied to all earrings of the screw clamp type, hence I do not wish to be limited to the precise details of construction disclosed since changes in carrying out the inventive concept disclosed may be made within the range of mechanical skill without departing from the spirit of the invention as defined in the appended claims.

What I claim is:

1. An earring of the screw-clamp type comprising a support having an arm with a screw-threaded opening therethrough, a screw-threaded shank engaging in said opening and having at one end an ear lobe engaging member and at its other end an enlarged finger-manipulating head normally spaced a substantial distance from the support arm, the manipulating head and the support arm being considered parts, one of which has a spring-tensioned detent means and the other a series of circumferentially spaced radial recesses, said detent means and recesses being adapted to be brought into cooperative interengagement as the manipulating head is axially advanced by rotation into proximity to the support arm to hold the screw-threaded shank against accidental rotation.

2. An earring according to claim 1 wherein the detent means is carried by the support arm and the recesses are formed in the manipulating head.

3. An earring according to claim 1 wherein the detent means are blunt wedges resiliently mounted on the support arm and the recesses are formed in both the periphery and side of the manipulating head facing the support arm.

4. An earring according to claim 1 wherein the detent means are blunt wedges resiliently mounted on the support arm and the recesses are formed in both the periphery and side of the manipulating head facing the support arm, and wherein upon advancement of the head toward the support, interengagement takes place, first between a detent means and the peripheral recesses in the manipulating head and, upon further advancement of the head, between a detent means and the facial recesses in the head.

5. An earring of the screw-clamp type comprising a support having an arm with a screw-threaded opening therethrough, a screw-threaded shank engaging in said opening and having at one end an ear lobe engaging member and at its other end an enlarged finger-manipulating head normally spaced a substantial distance from the support arm, a resilient element mounted on the support arm and having an opening therein through which the screw-threaded shank freely extends and a detent means directed away from the support arm, said manipulating head having a series of circumferentially spaced radial recesses which are adapted for cooperative interengagement with the detent means as the manipulating head is axially advanced by rotation into proximity to the support arm to hold the screw-threaded shank against accidental rotation.

JOSEPH A. STROMELLY.

REFERENCES CITED

The following references are of record in the file of this patent:

UNITED STATES PATENTS

| Number | Name | Date |
| --- | --- | --- |
| 1,185,467 | Beauchamp | May 30, 1916 |
| 1,985,809 | Timen et al. | Dec. 25, 1934 |
| 2,427,479 | Shatkin | Sept. 16, 1947 |